April 26, 1966

H. L. McCLELLAN 3,247,534

SCRAPLESS HEADING

Filed March 13, 1963

INVENTOR.
HERBERT L. McCLELLAN
BY
RICHEY, McNENNY & FARRINGTON
ATTORNEYS

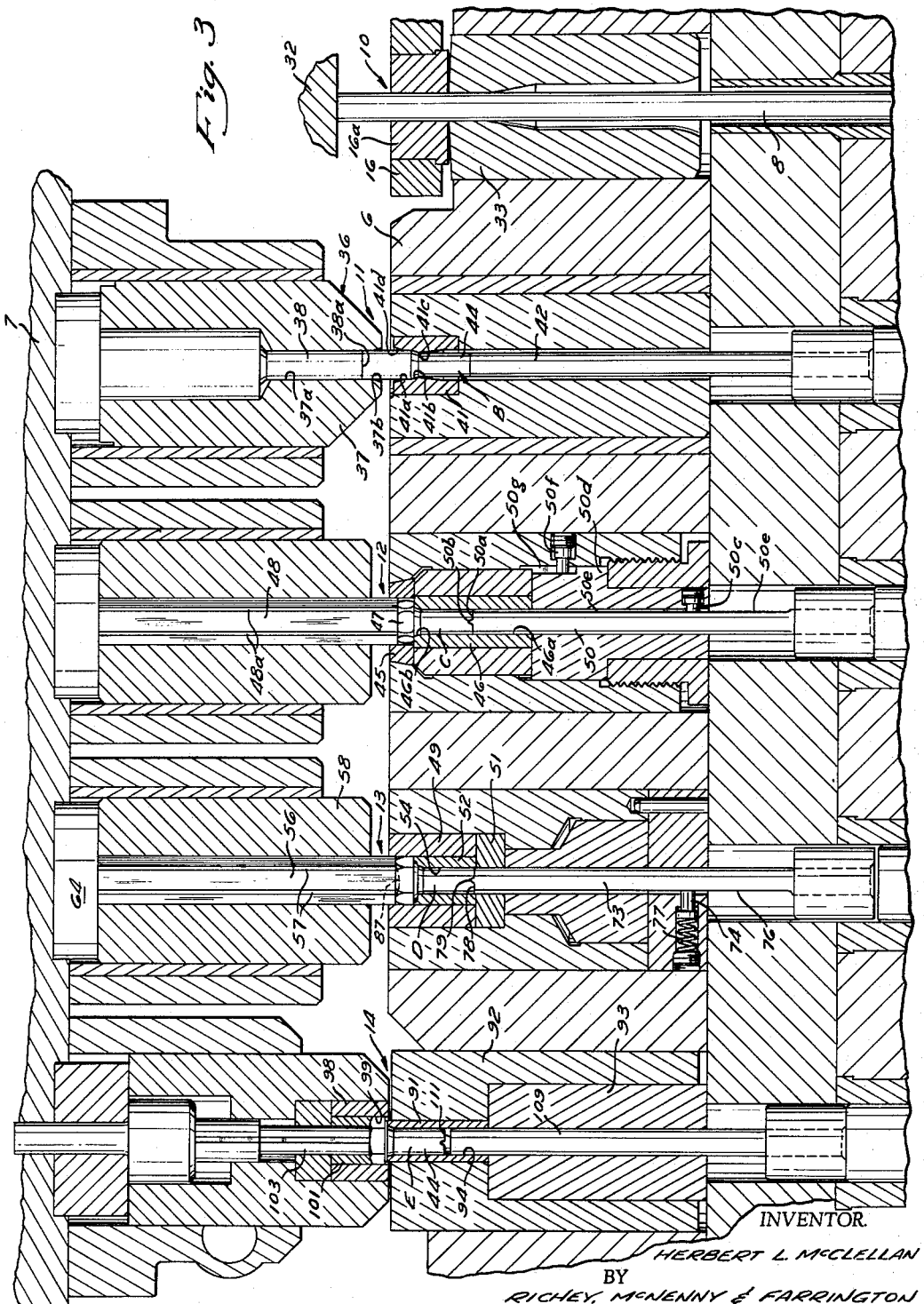

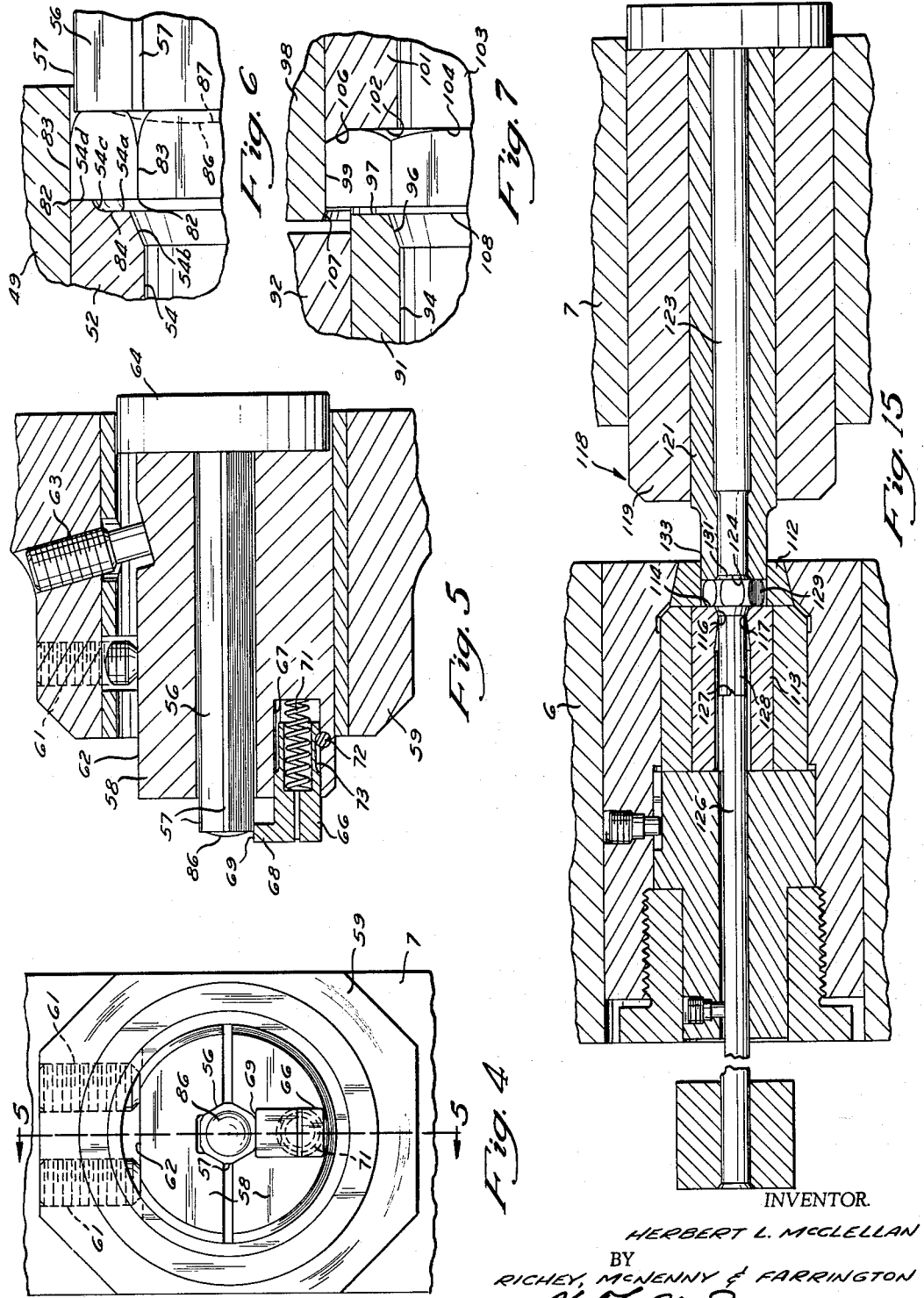

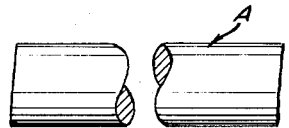
Fig. 8a    Fig. 8b
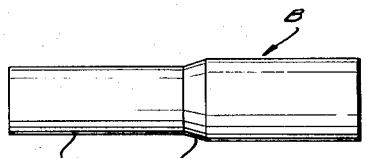
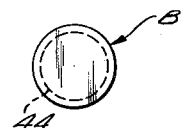
Fig. 9a    Fig. 9b
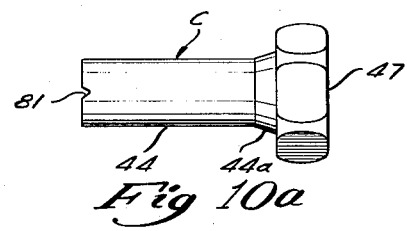
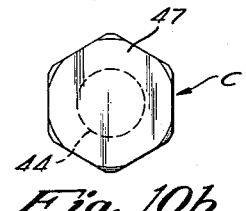
Fig. 10a    Fig. 10b
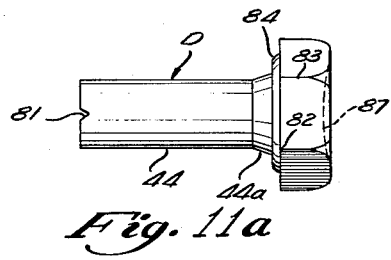
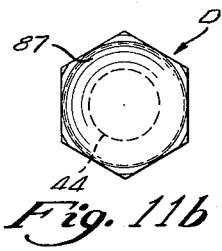
Fig. 11a    Fig. 11b
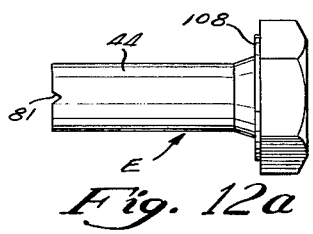
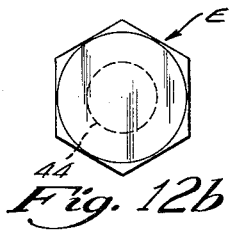
Fig. 12a    Fig. 12b

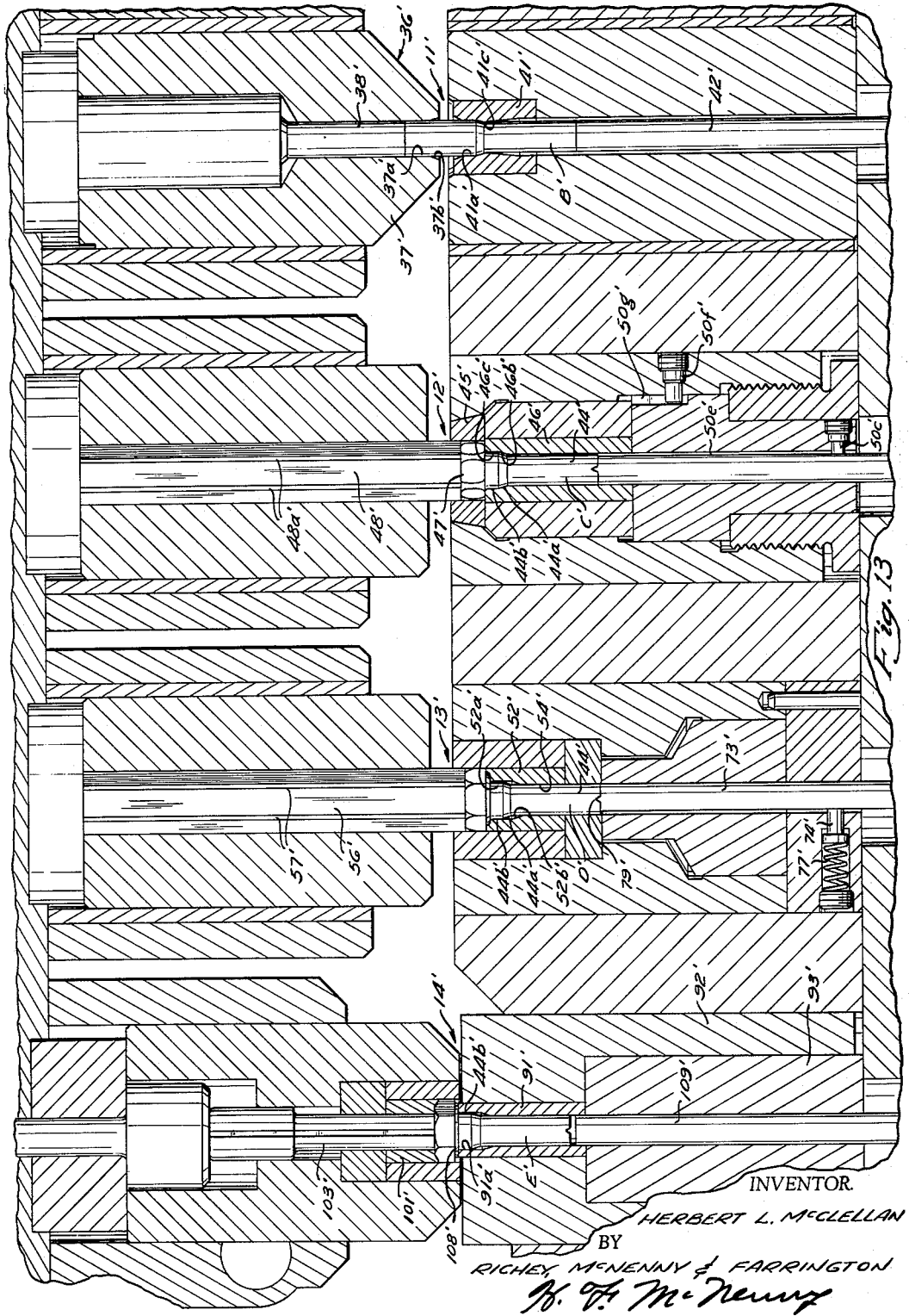

United States Patent Office 3,247,534
Patented Apr. 26, 1966

3,247,534
SCRAPLESS HEADING
Herbert L. McClellan, Tiffin, Ohio, assignor to The National Machinery Co., Tiffin, Ohio, a corporation of Ohio
Filed Mar. 13, 1963, Ser. No. 264,988
7 Claims. (Cl. 10—27)

This invention relates to a method and an apparatus for cold heading a blank for a bolt, screw or the like. This application is a continuation-in-part of my United States patent application Serial No. 193,841, filed May 10, 1962, now abandoned, which is in turn a continuation-in-part of the United States patent application Serial No. 127,193, filed July 27, 1961, now abandoned.

Progressive headers or forging machines of the type shown in the United States patent to Frost, No. 2,020,658, dated November 12, 1935, have been used for the manufacture, by cold heading, of blanks for bolts, screws and the like. Such machines upset a circular head on the blank and then trim away material to form the polygonal head shape required. This shearing to form the polygonal shape required on most bolt blanks results in scrap and increases the cost of manufacture. Although the cost of the scrap from each bolt blank is small, the aggregate expense is large since the forging manufacture of bolt blanks is a high speed, high production operation.

Such method of manufacture including the trimming of round heads to form polygonal heads has, however, been commercially successful, since the tools and dies used in such method have a relatively long life. This is true even though the head formed by trimming normally has some uneven edges caused by edge breakage during the shearing operation.

With a method and apparatus incorporating the instant invention, a well defined polygonal head having sharp clean edges is formed on a blank without scrap by cold forging. This is accomplished without excessive forging pressures so that tool and die life is compatible with economical production.

When upsetting cylindrical stock with endwise pressure, the upsetting material flows along slip planes inclined relative to the direction of the upsetting force. Such upsetting progresses with a maximum diameter of upset occurring first along a plane approximately midway between the ends of the upset. Therefore when forming a polygonal head by upsetting within a polygonal die cavity, the upsetting material first engages the centers of the flats of the die cavity. Further upsetting causes the material to take the shape of the die cavity, but the pressures required for continued upsetting build up rapidly since the engagement between the walls of the cavity and the upsetting material produces friction and inward pressure resisting further upsetting. Extreme pressures would be required to sharply fill the corners and edges of the head, particularly at the corners and edges adjacent to the end faces since the upsetting material tends to slip along inclined planes rather than radial planes. It is, therefore, impractical to upset polygonal heads with well defined corners by simple endwise pressures since the upsetting pressure required would be so great that the tools and dies would rapidly wear or break, making the manufacturing cost prohibitive.

With this invention, a first upset produces a generally polygonal head with unfilled corners. This upset does not require excessive pressure since there is no attempt to flow the material into the corners. Thereafter endwise upsetting pressures are applied to the blank adjacent to the corners to complete the sharply defined head. Since the pressure is exerted at the corners, the resistive effect of the engagement of the upsetting material with the die walls is minimized. Further, the localized application of the upsetting force minimizes the amount of radial flow necessary. As a result, the finished head is formed with well filled corners and the upsetting pressures are again sufficiently low to prevent excessive tool and die wear.

In the illustrated embodiments of this invention the blank is first upset to form a generally polygonal head with unfilled edges and corners. The head formed in this first step is then axially compressed in a die which localizes the forging pressure on the underside of the head adjacent to its periphery so that the material flows radially into the corners of the die to form a polygonal head having sharply defined edges and corners adjacent to the lower face. At the same time a circular projection is formed to provide material for a washer face. The blank is then crowned to finish the polygonal portion of the head and the circular projection is axially comprised and radially extended to form the required finished blank. During the crowning the forging pressure is again localized adjacent to the corners so that the edges and corners adjacent to the upper face are sharply filled.

It is an important object of this invention to provide a novel and improved method for cold forging blanks for bolts, screws, and the like, having a polygonal head without scrap or material waste.

It is another important object of this invention to provide a novel and improved method of cold heading to forge a finished polygonal head on a round section blank in a progressive header.

It is another object of this invention to provide a novel and improved apparatus for forming a polygonal head on round stock which avoids waste of stock material and which avoids the need for trimming operations on the head.

It is another object of this invention to provide a novel and improved die arrangement for cold heading polygonal headed blanks from round stock wherein the forging forces are minimized to improve die life.

It is another object of this invention to provide a novel and improved method and apparatus for forming polygonal heads on round stock wherein an initial upset forms a generally polygonal head having unfilled corners and subsequent operations are arranged to localize pressure adjacent to the corners and flow the stock to form sharply filled corners.

It is another object of this invention to provide a novel and improved method and apparatus according to the preceding object wherein such subsequent operations first provide filling of the corners adjacent to one end face and thereafter filling of corners adjacent to the other end face.

It is still another object of this invention to provide a novel and improved progressive header for polygonal headed blanks incorporating means to maintain proper orientation of the blanks as they are moved between the stations so that such blanks will move smoothly into the subsequent dies.

Further objects and advantages will be apparent from the following detailed description of presently preferred embodiments which are illustrated in the accompanying drawings.

In the drawings:

FIGURE 3 is a section through the die stations illustrating the structure of the dies and tools of one preferred embodiment of this invention;

FIGURE 4 is an enlarged fragmentary elevation of the tool at the third die station of the embodiment of FIGURE 3;

FIGURE 5 is a section taken along 5—5 of FIGURE 4 illustrating the structure and mounting of the alignment block;

FIGURE 6 is an enlarged fragmentary section of the third die station illustrating the structural details of the tools and the dies at that station;

FIGURE 7 is an enlarged fragmentary section of the fourth and final die station illustrating the structural detail of the tools and dies at that station;

FIGURES 8a and 8b are a side view and an end view of the initial blank sheared off at the shearing station;

FIGURES 9a and 9b are a side view and an end view of the blank formed at the first die station;

FIGURES 10a and 10b are a side view and an end view of the blank formed at the second die station;

FIGURES 11a and 11b are a side view and an end view of the blank formed at the third die station;

FIGURES 12a and 12b are a side view and an end view of the finished blank formed at the fourth die station;

FIGURE 13 is a section through the die stations of a second preferred embodiment of this invention used to form blanks for bolts having an unthreaded portion of shank;

FIGURE 15 is a section through the first die station of a fourth embodiment of this invention wherein the extrusion and initial upsetting are performed at a single die station.

Figure 1:
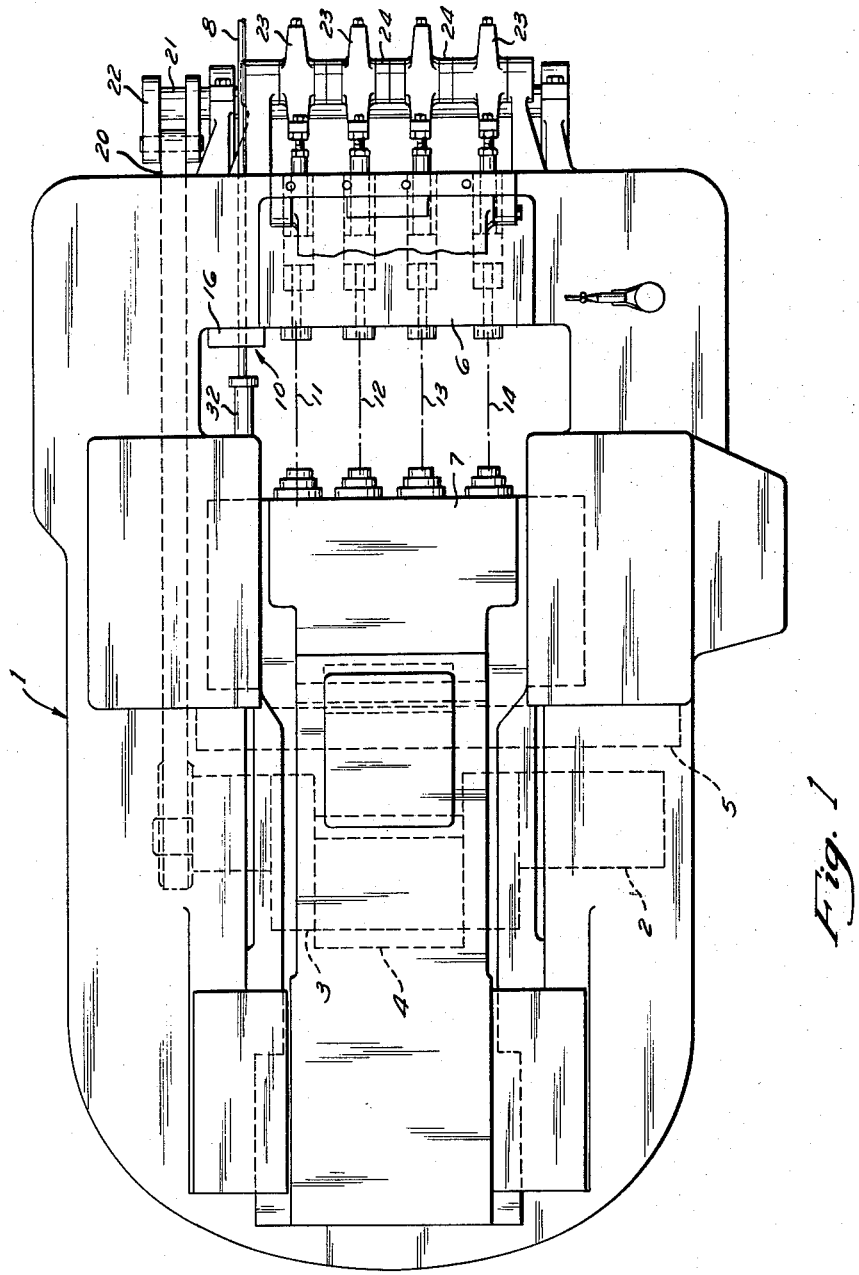
FIGURE 1 is a plan view of a progressive header suitable for the manufacture of bolt blanks according to this invention.

Referring to FIGURE 1, the numeral 1 designates a bed frame of any suitable design. A main crankshaft 2 is journaled in the opposite sides of the bed frame and is provided with a crank 3 having a connecting rod 4 journaled thereon. A countershaft 5 is geared to the crankshaft 2 for rotation at the same speed as the crankshaft. The bed frame is provided at its forward end with a die breast 6 and within guideways formed in the frame a header slide 7 is mounted to reciprocate toward and away from the die breast 6. The connecting rod 4 is pivoted on the slide to produce reciprocation thereof in response to crank rotation.

Figure 2:
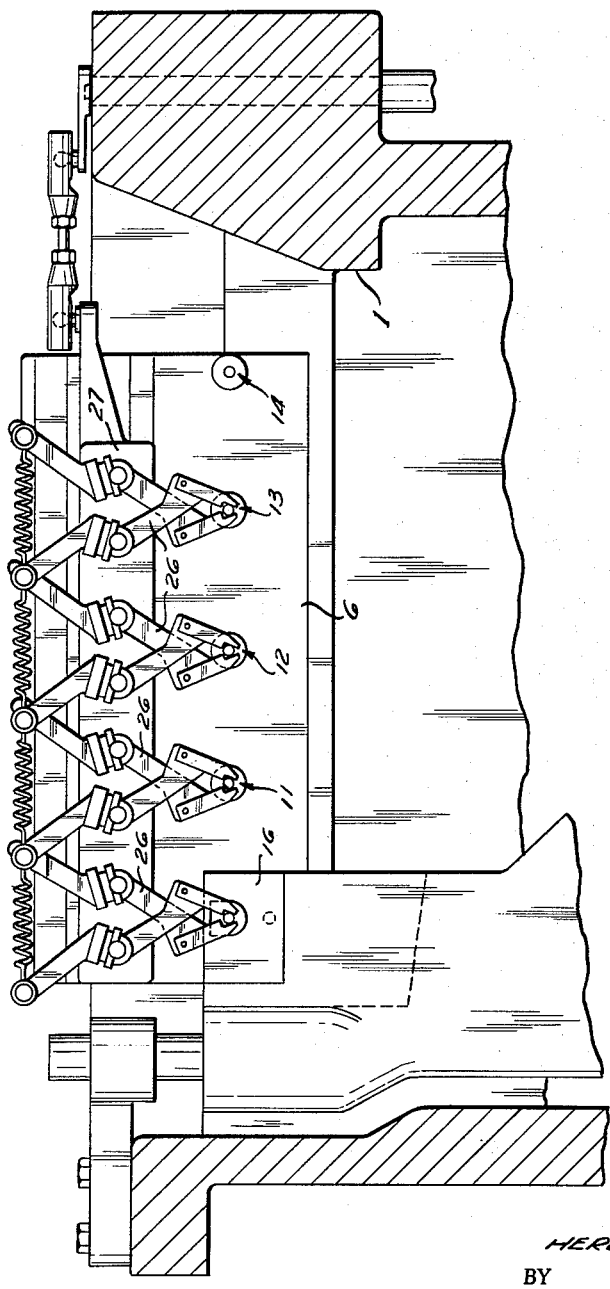
FIGURE 2 is a fragmentary cross-section illustrating the die face and a transfer mechanism for progressively moving a blank between die stations.

Wire or rod stock 8 is fed through the bed frame 1 by any conventional type of feed rollers, or the like, and is sheared at a shearing station 10 into blanks A shown in FIGURE 8 and transferred to the first die station 11. Referring to FIGURE 2, the stock is engaged by a shear including a vertically reciprocable knife 16 which shears off the blank A and carries it upward into horizontal alignment with the blank working stations wherein it is gripped by a first pair of transfer fingers 26. A knockout (not shown) is used to push the sheared blank from the vertically reciprocating knife 16. A detailed description of this shearing mechanism is contained within the United States patent to Friedman, No. 2,721,343, dated October 25, 1955.

A transfer mechanism is arranged to simultaneously carry blanks from the cut-off to the first die station 11, from the first die station 11 to a second die station 12, from the second die station 12 to a third die station 13 and from the third die station 13 to a fourth and final die station 14. Transfer fingers 26 are mounted on a carriage 27 which reciprocates horizontally back and forth in front of the die breast to accomplish this action. The fingers 26 are operated to grip blanks ejected from the dies and progressively position the blank in front of the next station for the subsequent operation. The entire transfer system is powered in timed relationship to the movement of the header slide so that blanks are progressively moved to each of the die stations. The structure illustrated for transferring the blanks progressively to each of the blank working stations is disclosed in detail in the United States patent to Clouse, No. 2,026,823, dated January 7, 1936.

Referring to FIGURE 3, wire stock 8 is fed through the die breast 6 at the shearing station 10 by conventional feed rollers until it engages an adjustable stock gauge 32 mounted on the frame 1. When the stock 8 engages the gauge 32, the proper volume of stock necessary to form the finished bolt blank extends beyond the face of a hardened bushing 33 which cooperates with cutter ring 16a on the knife 16 to shear off the blank A. The transfer fingers 26 operate to carry the blank A to the first die station 11 while the header slide 7 is in retracted position.

As the header slide 7 moves forward, the blank A is located in alignment with the die station 11 and is engaged by a tool assembly 36 mounted on the header slide 7 and released from the transfer fingers 26. The tool assembly 36 includes a sleeve 37 formed with a bore 37a and a rod or pin 38 therein having a forward end 38a spaced back from the forward end of the bore 37a to form in cooperation therewith a guide recess which fits over the outer end of the blank A to laterally support the blank as it is pressed through an extrusion die 41 mounted in the die breast 6 at the die station 11.

The extrusion die 41 is formed with a cylindrical guide section 41a leading to an extrusion throat 41b and an extrusion land 41c. The bore 37a and the guide section 41a are both formed with a diameter sized to closely receive the blank A and flaring ends 37b and 41d respectively to guide the ends of the blank thereinto.

As the header slide 7 moves forward the tool assembly presses the end of the blank A through the throat 41c forming the blank B illustrated in FIGURE 9. When the proper length of blank is extruded through the extrusion throat 41c to form the bolt shank 44, the shank engages a knockout pin 42. The engagement between one end of the blank with the forward end 38a of the pin 38 squares that end of the blank and the engagement of the other end of the blank with the knockout pin 42 provides some squaring of the other end of the blank. Preferably the tools are proportioned so there is no upsetting at this die station.

During the retraction of the header slide 7, the knockout pin 42 is moved forward in the usual manner to eject the blank B from the die so that it can be gripped by the second pair of transfer fingers 26. The knockout pins are operated by rocker arms 23 journaled on a pivot shaft 24 (illustrated in FIG. 1) and cams carried by a rocking camshaft 21. The camshaft 21 is rocked by a link 22 and connecting rod 20 driven by an eccentric on the crankshaft 2. A detailed description of this knockout mechanism is disclosed in the United States patent to Clouse, No. 2,139,936, dated December 13, 1938. The fingers 26 grip the shank 44 as it moves clear of the die and moves the blank B to the second die station 12. Simultaneously, the transfer fingers 26 move a subsequent blank A to the die station 11 so that a blank is worked at each die station during each forward stroke of the header slide 7.

Mounted in the die breast 6 at the second die station 12 is polygonal die 45 cooperating with a die sleeve 46 to form a polygonal die cavity. The die sleeve 46 is formed with a central bore 46a and a conical entrance 46b proportioned to receive the shank 44 of the blank B and the conical section 44a formed by the extrusion throat 41b at the die station 11. A knockout pin 50 extends into the bore 46a and is formed with an end face 50a spaced back from the die 45. The end face 50a is formed with a chisel point 50b extending thereacross. A plug 50c is mounted in the filler member 50d behind the die sleeve 46. The plug 50c engages a flat 50e on the pin 50 to prevent rotation of the pin while permitting axial motion thereof. A key 50f extends into a keyway 50g to insure proper orientation of the filler member 50d.

Mounted on the header slide 7 at the second die station 12 is a polygonal upsetting tool 48 having a polygonal outer surface which closely fits into the polygonal die 45. The corners 48a of the tool 48 are rounded slightly to eliminate the weakness produced by sharp corners and to lessen any tendency of tool damage when the end of the tool enters the die 45.

As the slide 7 moves forward the tool 48 pushes the blank B into the dies until the end of the blank is pressed over the chisel point 50b and engages the end face 50a preventing further movement of the blank. Continued forward movement of the tool 48 upsets a preliminary head 47 within the polygonal die 45. In the illustrated embodiment the polygonal die is hexagonal. However, if other polygonal shapes are required, the die and tool are changed to the required shape.

The blank C formed at the completion of the forward stroke of the tool 48 is illustrated in FIGURE 10. This blank includes a shank 44 having a diameter less than the diameter of the initial blank A, a conical section 44a, and a generally polygonal head 47. The generally polygonal head 47 does not have sharply filled corners since the pressure necessary to flow the blank material into sharply defined corners would be excessive and would result in extreme tool and die wear. During the upsetting, the material of the blank slips along shear planes inclined relative to the direction of the applied force causing the initial upsetting to produce a circular shape with the maximum diameter at a mid-section about halfway between the ends of the upset. Therefore, the upsetting material first engages the polygonal walls of the die at approximately the center of the flats. Further upsetting produces the generally polygonal head illustrated in FIGURE 10. The engagement of the upsetting material with the die flats produces friction and inward pressure resisting material flow into the corners. This resistance to flow and the fact that the natural upsetting action tends to occur along inclined slip planes combines to prevent flow into the corners particularly adjacent to the upper and lower faces of the head. In this invention the head formed in the first upsetting station is unfilled at the edges and corners and the tool and die pressures are sufficiently low to prevent excessive wear. The corners and edges are sharply filled in the operations occurring at the third and fourth die stations 13 and 14, respectively.

As the slide 7 moves back clear of the die station, the knockout 50 is moved forward to eject the blank. Since the knockout 50 is locked against rotation by the plug 50c and, since the chisel point 50b prevents rotation between the blank and knockout, the blank is prevented from turning about its axis as it is ejected from the dies. Therefore, the proper orientation of the polygonal head 47 is maintained until the transfer fingers 26 grip the blank C. The fingers maintain this orientation as the blank is transferred to the die station 13.

At the die station 13, the corners of the head adjacent the lower face are sharply filled out and an initial projection for the washer face is formed. The die assembly at the die station 13 includes a polygonal die 49 seated against a filler plate 51. A sleeve die 52 is mounted in the die 49 and is formed with a central passage 54 adapted to receive the shank 44 of the blank C. Referring to FIGURE 6, the forward end of the sleeve 52 is formed with a radial surface 54a extending from a conical section 54b to a curved inclined surface 54c. The forward end of the inclined surface 54c joins with a radial surface 54d which extends to the outer edges of the die sleeve 52. The junction between the inclined curved surface 54c and the radial surface 54d is circular, having a diameter slightly less than the distance across the flats of the polygonal die 49.

Mounted on the header slide 7 at the third die station 13 is a polygonal punch 56 formed with an external polygonal shape adapted to closely fit the polygonal die 49. Here again, the edges of the punch are rounded at 57 to eliminate sharp corners which could produce weakness and possible breakage. Referring to FIGURES 4 and 5, the punch 56 is mounted in a split collar 58 within a tool holder 59 on the header slide 7. Set screws 61 engage a flat 62 on the upper collar 58 for accurate adjustment of the alignment between the flats of the punch 56 and the die 49. A third set screw 63 locks the assembly back against a filler plate 64.

A guide block 66 is mounted in a bore 67 in the lower collar element 58 and is formed with an upwardly extending flange 68 terminating at an upper face 69 slidably engaging the lower flat of the polygonal punch 56. A spring 71 urges the guide block to the forward position illustrated in FIGURE 5. A key 72 extends across a keyway 73 in the guide block 66 and limits forward movement of the guide block to the position illustrated while permitting rearward movement against the action of the spring 71. As the header slide moves forward, the upper face 69 of the guide block 66 engages the lower face of the blank C in the transfer fingers to maintain proper alignment of the blank as it is bushed into the die and to insure that the polygonal head 47 of the blank C is properly oriented with respect to the polygonal die 49. When the slide 7 approaches its forward position, the end of the guide 66 engages the face of the die 49 and is pressed back into the bore 67 compressing the spring 71.

Referring again to FIGURE 3, a knockout pin 73 is mounted for sliding movement along the bore 54. A plug 74 is resiliently pressed against a flat 76 on the knockout pin 73 by a spring 77. The plug 74 serves a dual function of preventing rotation of the knockout pin 73 about its axis and in addition provides frictional resistance to axial movement of the knockout pin 73 so that the knockout pin is frictionally held in its forward position after the previous blank.

The knockout pin 73 is formed with a radial end face 78 and a chisel point 79, similar to the chisel point 50b of the knockout pin 50 at the die station 12. As the header slide 7 moves toward the die breast 6, the chisel point 79 is adjacent to the face of the die 49 since the knockout pin 73 is held in its forward position by the frictional engagement of the plug 74. The blank C has a groove 81 formed by the chisel point 50b at the die station 12 which fits over the chisel point 79 as the punch 56 pushes the blank C into the dies at the die station 13. Therefore, the blank C is guided and held at both ends as the blank is pushed into the dies. The threaded end is supported by the upper face 69 of the guide block 66, illustrated in FIGURES 4 and 5, and the shank end is supported by the engagement of the chisel point 79 and the groove 81. This support and guiding insures that the blank C is properly oriented and positioned with respect to the dies so that it will move smoothly into the dies at the die station 13. Preferably, the polygonal die 49 and the bore 54 are sized so that they are slightly larger than the corresponding portions of the blank to provide clearance for entry of the blank.

Referring now to FIGURES 3 and 6, as the punch 56 pushes the blank C into the polygonal die 49 the knockout pin 73 is pushed rearwardly. The underface of the head 47 of the blank C formed at the die station 12 is flat so the engagement of the underside of the head with the radial face 54d, adjacent to the corners, occurs before the underside of the head passes into the circular recess formed by the inclined curved surface 54c and the radial surface 54a. As a result, the forward movement of the tool 56 produces a pressure on the underside of the head adjacent to the corners, which operates to cut or skin back the material at the corners of the head causing the metal to flow radially, sharply filling the corners 82 at the underside of the head and sharply filling a portion of the edges 83 extending from the corners 82. At the same time, the metal radially within the face 54d flows axially to form a circular projection 84 within the recess formed by the surfaces 54a and 54c.

By localizing the pressure adjacent to the corners on the underside of the blank and cutting or skinning back the blank material, it is possible to produce sharply filled corners adjacent to the underface of the blank D, illustrated in FIGURE 11, without excessive pressures or die wear. The formation of the circular projection 84 at this station also provides the material for the washer face required on the finished bolt blank. As best illustrated in FIGURES 5 and 6, the forward end of the punch 56 is formed with a convex end surface 86 which forms a shallow recess 87 in the upper face of the blank D. The convex end surface 86 results in radial compressive forces on the punch 56 as well as axially compressive forces. Such radially compressive forces reduce the tendency for tool wear and breakage and result in improved tool life. Also, it eliminates any tendency for oil or air to become trapped between the blank and the tool end surface. Still further, the recess formed by the convex end surface 86 insures that the initial pressure in the subsequent operation will be applied at the periphery of the head.

As the header slide 7 moves rearwardly away from the die breast 6, the knockout pin 73 moves forward to eject the blank D from the dies at the die station 13. Here again, correct orientation of the blank during ejection is maintained. Since the knockout pin is prevented from rotating by the plug 74 and rotation of the blank relative to the knockout pin is prevented by the chisel point 79, the blank is held against rotation as it is ejected from the dies. The transfer fingers 26 grip the blank D ejected from the die station 13 and carry it to a position in alignment with the dies in the die station 14.

In the fourth die station 14, shown in FIGURES 3 and 7, the finished blank E is formed. At this die station the upper surface of the head is crowned, sharply filling in the remaining portions of the head and the washer face is radially pressed to a diameter substantially equal to the distance across the flats of the head.

A sleeve die 91 is mounted in a holder 92 and seats against a filler element 93. The sleeve die 91 is formed with a through bore 94 having a diameter proportioned to receive the shank 44 of the blank D with a slight clearance. A conical section 96 is formed at the forward end of the bore 94 to assist in guiding the shank of the blank into the bore 94 and also to receive the conical section 44a on the blank D. The sleeve die 91 is also formed with a radial end face 97 projecting forward from the end of the holder 92, as best illustrated in FIGURE 7.

The polygonal die cavity at this station is located in the die assembly mounted on the header slide. The die assembly includes a die sleeve 98 formed with a polygonal die cavity 99 and an inner sleeve 101 closely fitting the cavity 99 and formed with a forward face 102 shaped to crown the head of the blank. A knockout pin 103 is positioned with its forward face 104 flush with the forward face 103 of the inner sleeve 101. The forward face 102 of the inner sleeve 101 is formed with tangs 106 which extend forwardly adjacent to the corners of the die cavity 99.

Since the blank D is formed with a shallow recess 87, the initial axial engagement between the tool assembly on the header slide and the upper face of the head of the blank will be adjacent to the corners of the die cavity 99. Therefore, the initial upsetting force applied to the upper face of the polygonal head is in the area of the corners of the die cavity and the force is localized to insure that the head material will flow sharply filling the remainder of the edges of the polygonal head and the edges of the crown as illustrated in FIGURE 12. When the stroke is completed the upper face of the head within the crowned portion is flat. The flow of metal to flatten this end face does not require a substantial pressure in the center adjacent to the knockout pin 103, since this is the area of maximum depth of the recess 87. Therefore, substantial forces are not applied to the knockout pin 103 and the end face does not have any marks or projections which would otherwise occur at the joint between the knockout pin 103 and the inner sleeve 101 if substantial forces were applied in this area.

The forward end of the holder 92 is set back from the face of the die breast 6 leaving the end face 97 of the die sleeve 9 projecting forward to the plane of the face of the die breast at the other die stations. This forward projection of the end face 97 permits the forward face of the die sleeve 98 to extend past the face 97 when the slide 7 is in its forward extreme position best illustrated in FIGURE 6. This insures that the head of the blank D is completely confined radially by the die sleeve 98 before upsetting occurs preventing flash or distortion of the sharp corners of the lower face of the head previously formed at the die station 13. The cavity 99 is sized to fit very closely over the head of the blank D so that distortion or scalping of the flats will not occur. In practice the distance across the flats of the die cavity 99 should not exceed the distance across the flats of the head of the blank D by more than 1 percent. A chamfer 107 is provided at the forward end of the die sleeve 98 to assist in guiding the head of the blank D into the cavity 99 which cooperates with the rounded corners on the upper face of the blank D to smoothly guide the head of the blank into the die cavity however the chamfer 107 is past the lower face of the head when upsetting forces are applied.

The axial extent of the circular projection 84 is greater than the axial extent of the finished washer face 108. This greater axial length is provided so that sufficient skinning back will occur to sharply fill the lower corners of the blank D and so that sufficient material will be provided to form the finished washer face. During the upsetting occurring at the die station 14 the axial length of the circular projection 84 is shortened and the metal flows radially until the washer face has a diameter substantially equal to the distance across the flats of the head. The periphery of the washer face is also formed during this operation to a substantially cylindrical shape. By forming the circular portion 84 with a curved outer face in the die station 13 the washer face may be radially displaced to form a cylindrical face without the formation of cold shuts. In actual practice it has been determined that a bolt blank formed according to this invention has desirable grain structure and a high strength. The use of the die station 13 to sharply fill the lower or underside corners of the head and the die station 14 to fill out the upper corners also results in a clean well defined polygonal head without scrap.

A knockout pin 109 at the die station 14 is adjusted so that its forward end is spaced from its shank 44 of the blank during the upsetting operation. As the header slide moves back from the die breast both the knockout pin 109 and the knockout pin 103 move forward ejecting the blank from the die. Since there are no more upsetting operations after the die station 14 it is not necessary to maintain exact orientation of the blank during this ejection and the end face 111 of the knockout pin 99 is not formed with a chisel point. As the blank is ejected from the dies at the die station 14 it is gripped by a picker of a type disclosed in the United States patent to Friedman No. 2,278,103 dated March 31, 1942 and transferred to a blank receiving tube along which the blank moves to later operations such as pointing and threading.

FIGURE 13 illustrates a second embodiment of this invention which is used to form bolt blanks for bolts having an unthreaded portion of the shank. For simplification the shear station is not shown since it would be substantially identical to the shearing station shown in FIGURE 3 except the stock gauge would be adjusted to provide a proper volume of material in the blank of this embodiment. In this second embodiment the same numerals will be used as in the first embodiment with a prime (') added to indicate that they refer to the second embodiment.

In the first die station 11' the blank is extruded and the ends are squared. Mounted in the die breast is an extrusion die 41' having an entry or guide portion 41a' and an extrusion throat 41c'. Here again the tool assembly 36' includes a sleeve 37' formed with a bore 37a' and a rod or pin 38' having its forward ends spaced back from the forward end of the bore 37a' to provide a guide recess which fits over the outer end of the blank laterally supporting the blank as it is pressed through the extrusion die 41'.

At the second die station 12' the die sleeve 46' differs from the die sleeve 46 of the embodiment of FIGURE 3 in that it is provided with a bore 46c' at its forward end which extends to a conical section 46b'. Therefore, the blank B' moves into the die sleeve 46 to position wherein a portion of the unextruded section of the blank is spaced inward from the polygonal die 45'. At the completion of the upsetting stroke the blank C' has an extruded shank 44', a conical section 44a' and a cylindrical unextruded shank portion 44b'. Here again the head 47' is generally polygonal in shape having unfilled corners and edges.

At the die station 13' the die sleeve 52' differs from the die sleeve 52 of the embodiment of FIGURE 3 in that it is provided with a cylindrical bore 52a' having a diameter to receive the unextruded cylindrical section 44b' which extends inwardly from the face a distance greater than the length of the cylindrical section 44b' so that clearance is provided between the conical section 44a' and the conical section 52b' joining the bore 54' and the bore 52a'. This clearance insures that the stem will not be worked during the operation at the die station 13'. The knockout pin 73' is arranged so that there is clearance at its rearward end to prevent it from producing substantial forces on the end of the shank 44'. Here again the die sleeve 52' is formed to localize upsetting pressures adjacent to the edges of the lower face of the head to produce sharp filling of the corners and the edges of the head adjacent to the lower face in the same manner discussed above in connection with the embodiment of FIGURE 3.

At the last die station 14' the die sleeve 91' is also formed with a cylindrical section 91a' to receive the unextruded shank portion 44b'. Here again the bore 91a' is longer than the shank portion 44b' so that the shank will not be subjected to any pressure or working forces at this die station. Also, the knockout pin 109' is spaced back from the end of the shank.

The die sleeve 91' cooperates with the tools on the header slide at this die station to finish the washer face and crown the head sharply filling the upper edges and corners of the head in the same manner as discussed above in connection with the first embodiment.

Figure 14:
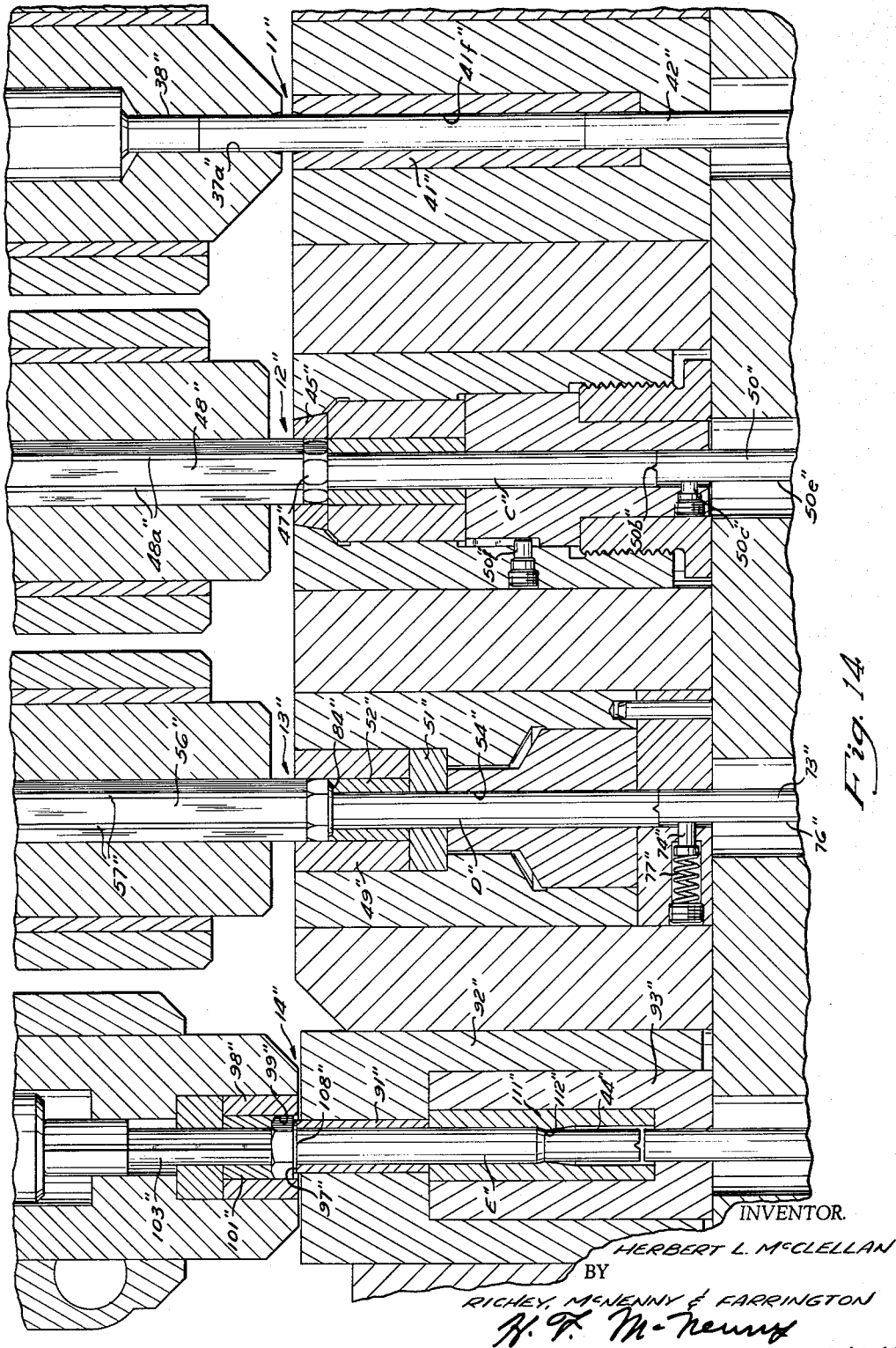
FIGURE 14 is a section through the die stations of a third preferred embodiment of this invention used to form long shank bolt blanks.

FIGURE 14 illustrates a third preferred embodiment of this invention which is used when forming bolts with long shanks. Here again the cut-off or shear station has not been illustrated since it would amount to a mere duplication of the shear station illustrated in FIGURE 3. The stock gauge of course is adjusted to provide the proper volume of material in the blank.

In this embodiment referenced numerals referring to similar elements will correspond to the referenced numerals of the first embodiment of FIGURE 3 but a double prime (″) is used to indicate the references to the third embodiment of FIGURE 14. In this embodiment the extrusion for the threaded portion of the shank does not occur at the first die station 11″. Therefore, the die sleeve 41″ is formed with a straight bore 41f″. The operation that occurs in the first die station 11″ serves to square the ends of the cut-off blank by applying end-wise pressure between the pin 38″ and the knockout pin 42″. The walls of the bore 41f″ and the bore 37a″ provide lateral confinement of the blank so that no upsetting occurs during this operation.

At the second die station 12″ the generally polygonal head 47″ is formed. Here again the knockout tool 50″ is formed with a chisel point 50b″ which forms a groove in the end of the shank to prevent rotation of the blank during the ejection from the second die station. Since the blank is not extruded at the first die station 11″ the dies at the second die station 12″ are formed with a central passage having a diameter substantially equal to the diameter of the shank which confines the shank portion of the blank during the upsetting operation.

The blank C″ is transferred to the third die station 13″ wherein the corners and edges adjacent to the underface of the head are sharply filled in the same manner discussed above in connection with the first embodiment. The dies at the die station 13″ are again arranged with a straight bore 54″ since the shank is not extruded at this point in the operation.

At the last die station 14″ the shank of the blank is extruded to form the reduced diameter section which is later threaded. Therefore, an extrusion die 111″ is mounted at the last die station formed with an extrusion throat 112″. As the header slide carries the polygonal die 98″ and the inner sleeve 101″ forward the head of the blank D″ is positioned within the polygonal die cavity 99″ and the stem of the blank is pushed along the die sleeve 91″ to the extrusion throat 112″. Further forward movement of the header slide presses the shank through the extrusion die forming the extruded portion 44″ on the blank E″. When the forward face 97″ engages the circular projection 84″ on the underside of the head further forward movement to the position of FIGURE 14 causes the head to be crowned sharply filling the upper edges and corners thereof and finishing by radial displacement the washer face 108″.

In both the embodiments of FIGURES 13 and 14 the mode of operation is substantially identical to the mode of operation of the embodiment of FIGURE 3. The difference being only in that the shank is formed in a different manner to provide the different shank types for different types of bolts.

In some instances, it is desirable to combine the operations occurring at the first and second die stations by extruding the shank and also forming the initial polygonal head in a single die station. With such a combination it is possible to reduce the number of die stations to three rather than four as illustrated in the first three embodiments. When it is desired to combine the operations occurring in the first two die stations an apparatus incorporating a first die station as illustrated in FIGURE 15 is substituted for the die stations 11 and 12 of the first embodiment of FIGURE 3. The tools and dies at the die stations 13 and 14 however remain identical.

In the embodiment illustrated in FIGURE 15 the cutoff blank is transferred from the shear station to a position in alignment with the tools and dies at the first die station of FIGURE 15. Mounted in the die breast 6 is a polygonal die 112 and an extrusion die 113. The forward end 114 of the extrusion die 113 cooperates with the polygonal die 112 to form the polygonal die cavity. The extrusion die 113 is provided with a conical extrusion throat 116 leading to an extrusion land 117. The tool assembly 118 includes a sleeve 119 supporting a tool 121 having an outer polygonal surface 133 which closely fits the polygonal die 112 mounted on the die breast 6. A central rod or pin 123 extends through the punch to an end face 124 rearwardly spaced from the forward end of the punch 121 to form a guide recess which fits over the outer end of the blank as the header slide 7 presses the blank into the extrusion die. When the proper length of blank is extruded through the extrusion throat 117 to form the bolt shank the extruded shank engages the forward end of a knockout pin 126 which prevents further extrusion of the blank. Here again the knockout is formed with a chisel point 127 which forms a mating groove in the end of the shank to prevent rotation of the blank as it is ejected from the die. The engagement between the extruded shank and the knockout pin 126 prevents further movement of the blank through the extrusion throat so continued forward movement of the tool upsets the preliminary head within the polygonal die on 112.

The blank formed at the completion of the forward stroke of the tool 121 includes a shank 128 having a diameter less than the diameter of the initial blank and a generally polygonal head 129 having unfilled corners and edges. A projection 131 is formed on the upper face of the polygonal head by the guiding recess in the tool assembly used to laterally support the blank during the extrusion operation. The blank formed at the die station in FIGURE 15 is transferred to a die station similar to the die station 13 of the embodiment of FIGURE 3. In the die station 13 the projection 131 is pressed down during the operation which sharply fills the corners and edges adjacent to the lower face and a blank is produced substantially identical to the blank D of the first embodiment. The blank is then worked in a last die station similar to the die station of 14 to FIGURE 3 to finish the operation.

In all of the embodiments of this invention illustrated the polygonal head of the blank is formed without scrap. In each case a generally polygonal head having unfilled corners and edges is formed in a first upsetting operation. Excessive pressures are not necessary to form a head wherein the upset material does not flow into sharply filled corners. In a subsequent upsetting operation the dies are arranged so that the upsetting forces are applied at one end face adjacent to the corners and edges of the initial head so that the material flows into the corners and edges adjacent to such end face. Thereafter the oposite end face is subjected to pressure again localized adjacent to the corners so that the corners and edges of the other end face are sharply filled. This method and apparatus therefore eliminates the requirement of substantial lateral flow in a radial direction at the ends of the upset section. Therefore the pressures required to produce the polygonal head by method and apparatus incorporating this invention is much smaller than it would be if such upsetting were attempted by centrally applied axial forces. Since the pressures required to form the head by method and apparatus incorporating this invention are low the tool and die life is satisfactory for economical production.

Although preferred embodiments of this invention are illustrated it is to be understod that various modifications and rearrangements of the parts may be resorted to without departing from the scope of the invention as defined in the following claims.

What is claimed is:

1. A method of forming a polygonal head washer face bolt blank comprising axially pressing a blank having an intermediate polygonal head of uniform cross-section, unfilled corners in a polygonal die having a radially extending end face adjacent the corners of said die and a circular end opening thereby shearing a circular portion of one end of said blank and radially flowing said blank along said end face to form a sharply filled corners at said one end, and thereafter axially pressing said blank within a uniform cross-section polygonal die with pressure initially applied adjacent the corners of the other end of said blank sharply filling the corners of said other end.

2. A method of forming a polygonal head washer face bolt blank from cylindrical stock comprising extruding a portion of stock to a smaller diameter and upsetting another portion of the stock to form a generally polygonal head with a substantially uniform cross-section and unfilled corners, axially pressing said head in a uniform cross-section polygonal die having a radially extending end face adjacent the corners of said die and a circular end opening thereby cutting a circular portion on one end of said blank and radially flowing material outside said circular portion to form sharply filled corners at said one end, and thereafter axially pressing said head with pressure initially applied between said circular portion and the corners of the other end of said blank crowning said other end and sharply filling the corners adjacent thereto and at the same time axially shortening and radially extending said circular portion to form a finished article.

3. A method of forging bolt blanks having a polygonal head and a round shank from cylindrical pieces of stock comprising upsetting a portion of said stock forming a generally polygonal head with unfilled corners, axially pressing the underside of said head against a circular opening having a diameter larger than said stock, cutting a circular section on said underside and at the same time radially flowing the head around said opening in a polygonal die of uniform cross-section sharply filling the corners of said head at said underside, and thereafter positioning said head in a polygonal die of uniform cross-section and axially pressing said head along the end of said circular section by pressure applied at the corners of the other side of said head thereby sharply filling the corners of said other side of said head and radially enlarging said cylindrical section to a diameter substantially equal to the diameter across the flats of said head.

4. A method of forging bolt blanks having a polygonal head and a round shank from cylindrical pieces of stock comprising extruding a first portion of said stock reducing its diameter to form a shank, upsetting other portions of said stock forming a generally polygonal head with unfilled corners, positioning said head in a polygonal die cavity of uniform cross-section and axially pressing the underside of said head adjacent said shank against a radial end wall adjacent the corners of said head while a circular section radially within said end wall is unsupported, cutting a circular projection on said underside and at the same time radially flowing material along said end wall sharply filling the corners of said head at said underside, and thereafter positioning said head in a polygonal die of uniform cross-section and axially pressing said head along the end of said circular projection by pressure applied at the corners of the other side of said head thereby crowning said head while sharply filling the corners of said other side of said head and radially enlarging said circular projection to a diameter substantially equal to the diameter across the flats of said head.

5. A method of forming an article having a shank and a polygonal head from cylindrical stock comprising upsetting a portion of stock forming an intermediate polygonal head of substantially uniform cross-section having unfilled corners, thereafter providing complete lateral confinement of one end of said intermediate head in a polygonal die cavity of substantially uniform cross-section, and while said one end of said intermediate head is so confined applying endwise pressure thereto, said endwise pressure being initially applied along said one end at zones adjacent the corners of said one end while the portions of said one end radially inward of said zones are substantially free of such pressure, said endwise pressure radially flowing material adjacent said corners into said corners sharply filling the corners of said head at said one end.

6. A method of forming an article having a shank and a polygonal head from cylindrical stock comprising upsetting a portion of stock forming an intermediate polygonal head of substantially uniform cross-section having unfilled corners, thereafter providing complete lateral confinement of one end of said intermediate head in a polygonal die cavity of substantially uniform cross-section, and while said one end of said intermediate head is so confined applying first endwise pressure thereto, said first endwise pressure being initially applied along said one end at zones adjacent the corners of said one end while the portions of said one end radially inward of said zones are substantially free of such pressure and thereafter providing lateral confinement of the other end of said intermediate head in a polygonal die cavity of substantially uniform cross-section, and while said other end is so confined applying second endwise pressure thereto, said second endwise pressure being initially applied along said other end at zones adjacent the corners of said other end while the portions of said other end inwardly of said zones are substantially free of such pressure, the application of said first and second endwise pressures producing radial flow of material of said head at said zones sharply filling the adjacent corners of said head at both ends thereof.

7. A method of forming an article having a shank and a polygonal head from cylindrical stock comprising upsetting a portion of stock forming an intermediate polygonal head of substantially uniform cross-section having unfilled corners, and a shallow central recess at at least one end thereof, thereafter providing complete lateral confinement of said one end of said intermediate head in a polygonal die cavity of substantially uniform cross-section, and while said one end of said intermediate head is so confined applying endwise pressure thereto, said endwise pressure being initially applied along said one end at zones adjacent the corners of said one end while the portions of said one end radially inward of said zones are substantially free of such pressure, said endwise pressure applied at said zones producing radial flow of the material of said head at said zones sharply filling the corners at said end and also forming a flat end surface at said one end.

References Cited by the Examiner

UNITED STATES PATENTS

| | | | |
|---|---|---|---|
| 1,832,167 | 11/1931 | Wilcox | 10—27 |
| 2,062,641 | 12/1936 | Clouse | 10—86 |
| 2,227,810 | 1/1941 | Mitchell | 10—24 |
| 2,250,043 | 7/1941 | Wintle | 10—27 |
| 2,278,103 | 3/1942 | Friedman | 10—12 |
| 2,287,214 | 6/1942 | Wilcox | 10—27 |
| 2,721,343 | 10/1955 | Friedman | 10—12 |
| 2,799,027 | 7/1957 | Hatebur | 10—27 |
| 2,843,862 | 7/1958 | Smith | 10—24 |
| 2,939,160 | 6/1960 | Mitchell | 10—26 |

FOREIGN PATENTS 599,567   7/1934   Germany.

ANDREW R. JUHASZ, *Primary Examiner.*